(12) United States Patent
Becker

(10) Patent No.: US 9,143,173 B2
(45) Date of Patent: Sep. 22, 2015

(54) SYSTEM AND METHOD FOR ESTIMATING AN AMPLIFIER OPERATING POINT USING MEASUREMENTS AT A RECEIVER

(71) Applicant: Hughes Network Systems, LLC, Germantown, MD (US)

(72) Inventor: Neal Becker, Frederick, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 14/482,238

(22) Filed: Sep. 10, 2014

(65) Prior Publication Data

US 2015/0010095 A1 Jan. 8, 2015

Related U.S. Application Data

(63) Continuation of application No. 13/893,435, filed on May 14, 2013, now abandoned.

(60) Provisional application No. 61/801,167, filed on Mar. 15, 2013.

(51) Int. Cl.
| | |
|---|---|
| *H04B 1/06* | (2006.01) |
| *H04B 17/10* | (2015.01) |
| *H04B 1/04* | (2006.01) |
| *H04B 17/373* | (2015.01) |

(52) U.S. Cl.
CPC ............... *H04B 1/06* (2013.01); *H04B 17/104* (2015.01); *H04B 1/0475* (2013.01); *H04B 17/373* (2015.01)

(58) Field of Classification Search
CPC ...... H04B 1/0475; H04B 1/06; H04B 17/104; H04B 17/373; H03F 2201/3203
USPC .................. 375/259, 285, 297, 316; 370/252; 330/149–152
See application file for complete search history.

(56) References Cited

U.S. PATENT DOCUMENTS

| | | | | |
|---|---|---|---|---|
| 2004/0240578 | A1* | 12/2004 | Thesling | 375/285 |
| 2006/0227885 | A1* | 10/2006 | Thesling | 375/259 |
| 2009/0067538 | A1* | 3/2009 | Thesling | 375/295 |
| 2014/0269955 | A1* | 9/2014 | Becker | 375/259 |

* cited by examiner

*Primary Examiner* — Daniel Washburn
*Assistant Examiner* — Eboni Hughes
(74) *Attorney, Agent, or Firm* — Potomac Technology Law, LLC

(57) ABSTRACT

An apparatus includes a receiver component, a first signal processing component and a second signal processing component. The receiver component can receive a transmission signal, wherein the received transmission signal reflects an encoded and modulated initial source signal, amplified via a source transmitter, and transmitted over one or more channels of a wireless communications network. The first signal processing component can process the received transmission signal to generate a replica transmission signal that estimates the encoded and modulated initial source signal. The second signal processing component can determine an optimal parametric function for modeling the source transmitter, wherein the determination of the optimal parametric function comprises an iterative non-linear curve-fitting process, and wherein the optimal parametric function reflects one or more parameters of the source transmitter.

10 Claims, 10 Drawing Sheets

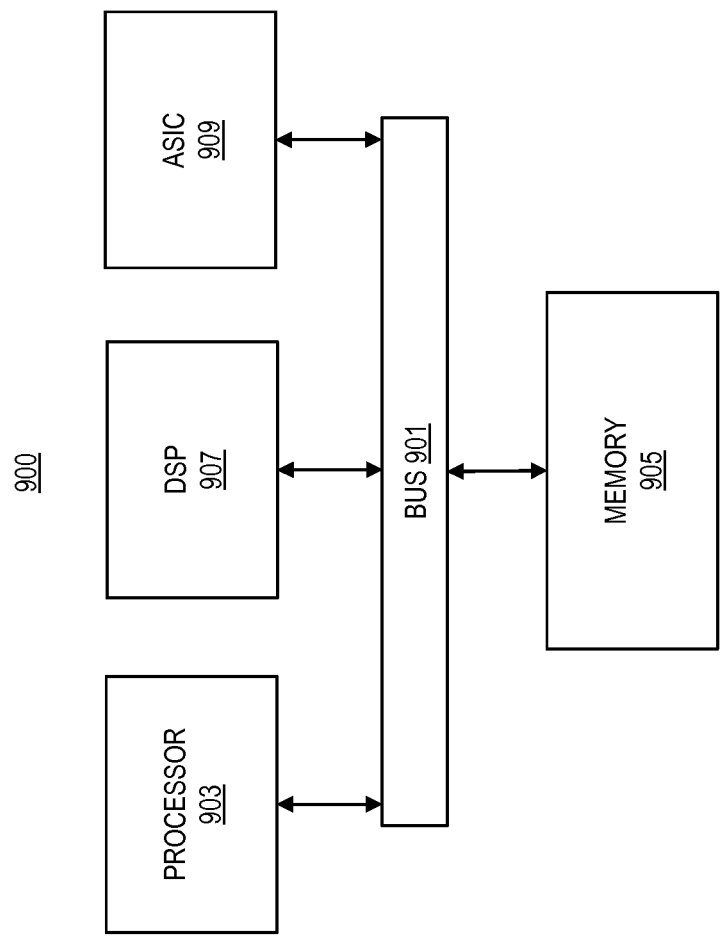

SYSTEM AND METHOD FOR ESTIMATING AN AMPLIFIER OPERATING POINT USING MEASUREMENTS AT A RECEIVER

RELATED APPLICATIONS

This application is a continuation, and claims the benefit of the earlier filing date under 35 U.S.C. §120, from U.S. patent application Ser. No. 13/893,435 (filed 14 May 2013), which claims the benefit of the earlier filing date under 35 U.S.C. §119(e) of U.S. Provisional Application Ser. No. 61/801,167 (filed 15 Mar. 2013), the entireties of which are incorporated herein by reference.

BACKGROUND

In a communications system, multiple carriers may operate in a Frequency Division Multiplex (FDM) arrangement, where different transmitters are operated at different (but nearby) frequencies. To reduce the likelihood that the different transmissions interfere with each other, the various components on the transmit side should be operated in a linear manner. If the components are operated nonlinearly, then in general, the output spectrum of a transmitter will "regrow" and interfere with its neighbors (e.g., creating adjacent channel interference (ACI)).

For most of the transmitter design, the requirement for linearity is not difficult to meet. It is usually a matter of operating the various stages of amplification with sufficient backoff so they remain in the linear operation region. For the final amplifier stage (HPA), this is more difficult. To allow enough backoff would mean to buy a more expensive amplifier than is actually needed, and also would result in lower power efficiency, increasing power supply and heat removal costs. The result is that to minimize cost, it is necessary to use an amplifier that is just large enough to operate with some minimal backoff to limit interference. Having done this, the problem becomes that if the drive level to the amplifier (operating point) is not carefully controlled, then the amplifier could still be overdriven resulting in excessive ACI. Therefore, to minimize cost and allow the use of the minimal amplifier, it is critical to control the operating point of the amplifier. Even if the drive level to this amplifier was kept constant, the amplifier itself may change characteristics over temperature and frequency. So, a reliable method of determining the operating point is needed. While it may be feasible in some cases to measure parameters on the transmit side, e.g., amplifier input power, temperature, etc., for a low-cost transmitter this is not feasible.

What is needed, therefore, is an approach to reliably measure the operating point of a transmitter amplifier, without requiring special instrumentation at the transmitter, based on measurements performed at a receiver.

SOME EXAMPLE EMBODIMENTS

These and other needs are addressed by embodiments of the present invention, whereby a system and methods are provided for reliable measurement of the operating point of a transmitter amplifier, without requiring special instrumentation on the transmitter, based on measurements performed at a receiver.

In accordance with example embodiments of the present invention, a method comprises receiving a transmission signal, wherein the received transmission signal reflects an encoded and modulated initial source signal, amplified via a source transmitter, and transmitted over one or more channels of a wireless communications network. The method further comprises processing the received transmission signal to generate a replica transmission signal that estimates the encoded and modulated initial source signal, determining an optimal parametric function for modeling the source transmitter, wherein the determination of the optimal parametric function comprises an iterative non-linear curve-fitting process, and wherein the optimal parametric function reflects one or more parameters of the source transmitter. According to further embodiments of the invention, the processing the received transmission signal comprises demodulating and decoding the received transmission signal to generate a replica source signal that estimates the initial source signal, and encoding and modulating the replica source signal to generate a replica transmission signal that estimates the encoded and modulated initial source signal. According to further aspects of the method, the one or more parameters of the source transmitter comprise a gain parameter reflecting an amplification gain of the source transmitter.

In accordance with further example embodiments of the present invention, an apparatus comprises a receiver component configured to receive a transmission signal, wherein the received transmission signal reflects an encoded and modulated initial source signal, amplified via a source transmitter, and transmitted over one or more channels of a wireless communications network. The apparatus further comprises a first signal processing component configured to process the received transmission signal to generate a replica transmission signal that estimates the encoded and modulated initial source signal, and a second signal processing component configured to determine an optimal parametric function for modeling the source transmitter, wherein the determination of the optimal parametric function comprises an iterative non-linear curve-fitting process, and wherein the optimal parametric function reflects one or more parameters of the source transmitter. According to further embodiments of the invention, the first signal processing component comprises a demodulator/decoder component configured to demodulate and decode the received transmission signal to generate a replica source signal that estimates the initial source signal, and an encoder/modulator component configured to encode and modulate the replica source signal to generate a replica transmission signal that estimates the encoded and modulated initial source signal. According to further aspects of the apparatus, the one or more parameters of the source transmitter comprise a gain parameter reflecting an amplification gain of the source transmitter.

Still other aspects, features, and advantages of the present invention are readily apparent from the following detailed description, based on the figures and description illustrating and describing a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF SUMMARY OF THE DRAWINGS

Embodiments of the present invention are illustrated by way of example, and not by way of limitation, in the accompanying figures, in which like reference numerals refer to similar elements, and in which:

FIG. 9 illustrates a block diagram of a chip set that can be utilized in implementing example embodiments of the present invention.

DETAILED DESCRIPTION

A system and methods for reliable measurement of the operating point of a transmitter amplifier, without requiring special instrumentation on the transmitter, based on measurements performed at a receiver, are presented herein. In accordance with example approaches, an original signal is replicated, modeling the transmit amplifier function with a single function having two variables. An error between the replicated original signal and a signal created with the modeled transmit amplifier function is determined, and then the two variables of the single function are iteratively modified to minimize the error. Further, because only a single equation is needed, the processing resources to estimate the transmitter operating point are minimized.

Figure 1A:
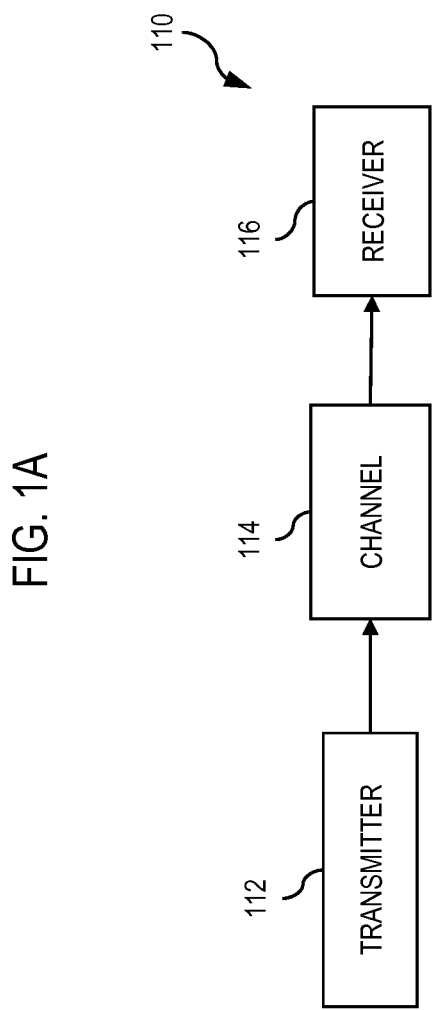
FIGS. 1A and 1B illustrate communications systems capable of employing an approach for reliable measurement of the operating point of a transmitter amplifier, based on measurements performed at a receiver, in accordance with example embodiments of the present invention.
Figure 1B:
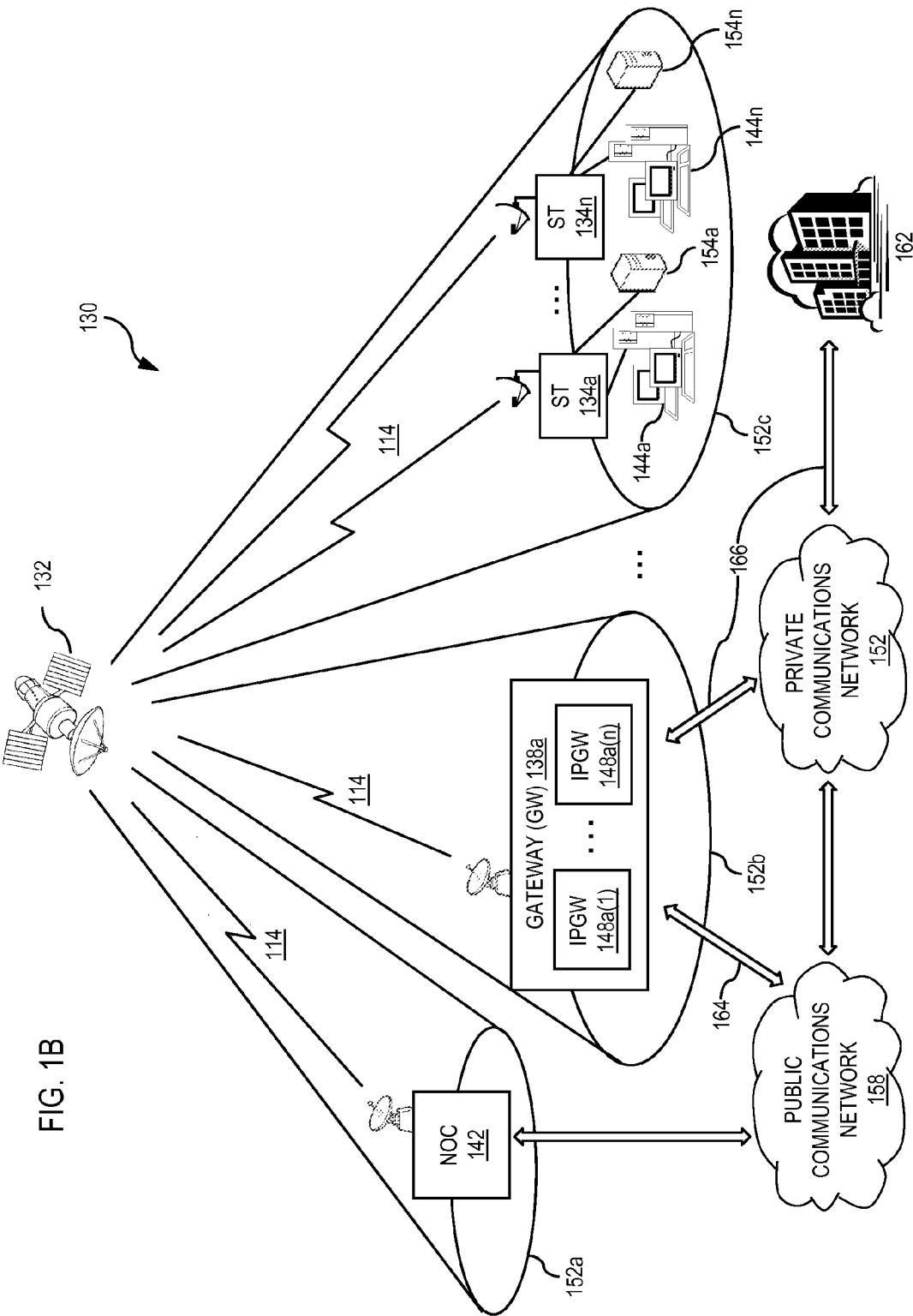

FIGS. 1A and 1B illustrate communications systems capable of employing an approach for reliable measurement of the operating point of a transmitter amplifier, based on measurements performed at a receiver, in accordance with example embodiments of the present invention. With reference to FIG. 1A, a broadband communications system 110 includes one or more transmitters 112 (of which one is shown) that generate signal waveforms for transmission to one or more receivers 116 (of which one is shown). The signal waveforms are transmitted across a communications channel 114, which (for example) may comprise a channel of a terrestrial, wireless terrestrial or satellite communications system. In this discrete communications system 110, the transmitter 112 has a signal source that produces a discrete set of data signals, where each of the data signals is transmitted over a corresponding signal waveform. The discrete set of data signals may first be encoded (e.g., via a forward error correction code) to combat noise and other issues associated with the channel 114. Once encoded, the encoded signals may then be modulated onto a carrier for transmission over the channel 114. The signal waveforms are attenuated, or otherwise altered, by communications channel 114.

With reference to FIG. 1B an exemplary satellite communications system 130, is depicted. Satellite communications system 130 includes a satellite 132 that supports communications among multiple satellite terminals (VSATs) 134a-134n, at least one gateway (GW) including a plurality of associated IP gateways (IPGWs) 148a(1) to 148a(n), and a network operations center (NOC) 142. The NOC performs the management plane functions of the system, while the GWs perform the data plane functions of the system. The NOC can communicate with each GW via the satellite, or via a secure private communications network 152 (e.g., an IPsec tunnel over a dedicated link or a virtual private network (VPN) or IPsec tunnel through a public network, such as the Internet). Additionally, each gateway and the NOC can have connectivity to one or more public communications networks 158, such as the Internet or a PSTN. According to different embodiments, for example, the GWs may be co-located with the NOC or may be geographically distributed within different beams of the satellite 132 (e.g., in the case of a spot-beam satellite system). The STs 134a-134n provide connectivity to one or more hosts 144a-144n and/or routers 154a-154n, respectively, which provide communications applications and services to respective end-users.

Such satellite communications systems 130, as depicted in FIG. 1B, generally operate as a bent-pipe system, where the satellite essentially operates as a repeater or bent pipe for transmissions between the GWs and the STs. In a bent-pipe system, communications to and from the STs are transmitted over the satellite 132 to and from respective GWs/IPGWs. Further, in a spot beam system, any one spot beam operates as a bent-pipe to a geographic region covered by the beam (e.g., the spot beams 152a, 152b, 152c), whereby each spot beam operates as a bent pipe communications channel to and from the STs and/or GW(s)/IPGW(s) within the geographic region covered by the beam. For example, for a data communication from Host 144a/ST 134a to a public communications network 158 (e.g., the Internet), the data is first transmitted, via the satellite 132, from the ST 134a to a respective IPGW (e.g., IPGW 148a(1)). The IPGW 148a(1) then determines the destination as being the Internet 158, and repackages the data (e.g., as a TCP/IP communication) and routes the data communication to the Internet 158 (e.g., via a terrestrial link 164). Further, in a corporate network, for example, a corporation may deploy various remote STs at remote offices. More specifically, ST 134n, located at a remote corporate location, may desire to securely communicate with the corporate headquarters 162. Accordingly, for a data communication from ST 134n to the corporate headquarters 162, the data is first transmitted, via the satellite 132, from the ST 134n to a respective IPGW (e.g., IPGW 148a(n)). The IPGW 148a(n) then determines the destination as being the corporate headquarters 162, and repackages the data (e.g., as an IPsec communication) and routes the IPsec data communication, via the secure terrestrial links 166 (over the private network 152), to the corporate headquarters 162. The various data communications over the satellite system 130 are generally referred to in the context of the gateways/IP gateways, whereby transmissions from a GW/IPGW to an one or more STs is referred to as an outroute or forward channel transmission, and transmissions from a one or more STs to a GW/IPGW is referred to as an inroute or return channel transmission.

The overall efficiency of the return link depends on the ability to run transmitter 110 and transmitter 112 at an output power level that is as high as possible to obtain without the deleterious effects of saturation. Transmitter saturation is a non-linearity that distorts the transmitted signal. A common method to determine when a transmitter is approaching saturation is to measure the output power of the transmitter and send a signal back to the modem when the power exceeds a threshold. This method, however, adds cost to both the transmitter and the modem. Also, due to a large number of variables (e.g., temperature, cabling length between the transmitters and the modems, etc.), it is often difficult to determine when a transmitter is operating at or near saturation.

In operation, the degree of transmitter saturation is measured at hub receiver 126 from a transmitted communications signal received from either transmitter 110 or transmitter 112. Hub receiver 126 may then issue an instruction to a remote terminal to control the transmit power level of transmitter 110 or transmitter in response to the saturation estimation. Hub receiver 126 may also control other parameters in a similar manner. Accordingly, because the saturation estimation and control are handled by hub receiver 126 rather than the transmitter 110, transmitter 112, modem 114, or modem 116 the cost of the transmitter and/or modem is reduced.

Additionally, each of transmitter 110 and transmitter 112 will be able to operate at its true maximum power level instead of a predetermined maximum power level that may be below the actual maximum power level of transmitter 110 and transmitter 112. For example, assume that a particular transmitter specification requires a maximum transmit power level of 1.0 per unit W before the onset of saturation. However, if a particular transmitter is capable of transmitting at 1.1 per unit W before the onset of saturation, the modem associated with the transmitter will monitor the transmitters transmit power level and prevent further power increases beyond 1.0 per unit W, thus preventing the transmitter from transmitting at its true maximum power output level. The receiver-based saturation estimator, however, instructs the transmitter to increase its transmit power based on the actual transmitter saturation level, and thus the transmitter will be able to transmit at a power level of up to 1.1 per unit W.

Likewise, each transmitter will only operate up to its true saturation level. For example, assume that a particular transmitter specification requires a maximum transmit power level of 1.0 per unit W before the onset of saturation. However, over time, a particular transmitter may experience performance degradation, and may be capable of transmitting only up to 0.9 per unit W before the onset of saturation. Because the receiver-based saturation estimator can be used by the system controller when instructing the transmitter to increase the transmit power based on the actual transmitter saturation level, the transmitter will not be overdriven deep into saturation.

Figure 2:
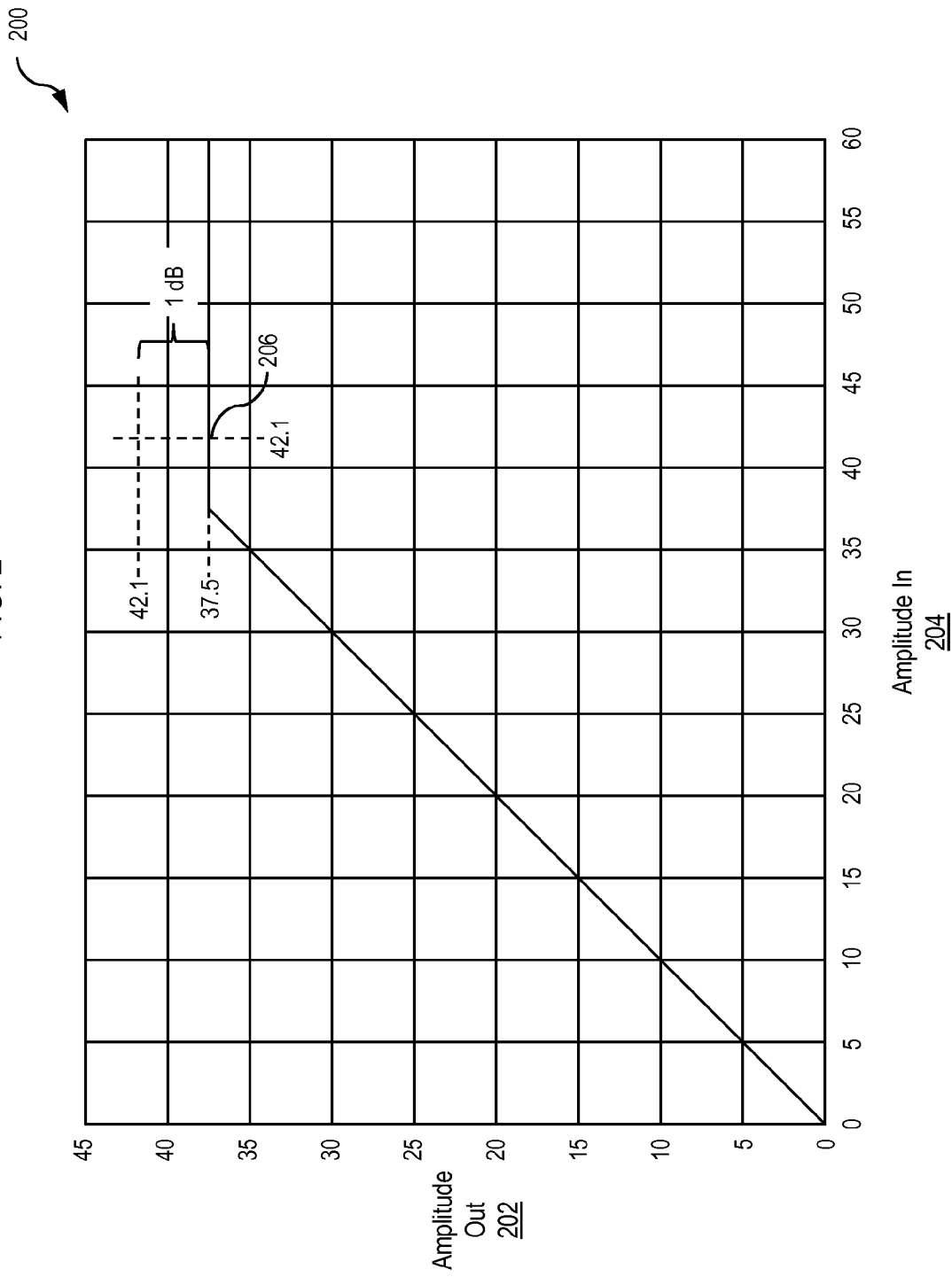
FIG. 2 illustrates an example hard limited saturation transfer function.

FIG. 2 illustrates an example hard limited saturation transfer function 200, as well as an amplitude input to output transfer function of an unmodulated carrier wave. The transfer function is with respect to the amplitude, such as an input and an output voltage. With reference to FIG. 2, the hard limited saturation transfer function 200 includes a y-axis 202, an x-axis 204, and a saturation point 206. The X-axis 202 is the amplitude of an outbound signal, and the Y-axis 204 is the amplitude of an inbound signal. The saturation point 206 corresponds to a 0 dB input backoff (IBO). The 0 dB input back off is defined as the input point where the output is 1 dB compressed (or below) the expected output point had the transmitter been perfectly linear. This point corresponds to an input at approximately 42.1 units. In operation, the transfer curve of FIG. 2 corresponds to an unmodulated carrier. Actual communications signals, however, are typically modulated. For example, a QPSK (or 8-ary) modulated signal, filtered with a 25% root raised cosine filter, has an amplitude that is dependent on the data. The fluctuations in amplitude are "clipped" as per the non-linearity resulting in the signal distortion.

An optimum drive level of a transmitter may be determined from FIG. 2. The optimum drive level is the optimum IBO operating point level where maximum signal-to-noise ratio (SNR) is achieved at the hub receiver. Increasing the signal strength, given a relatively fixed noise level at the receiver, maximizes the SNR. Driving the input power to a maximum at the transmitter, however, will not necessarily result in achieving a maximum SNR at the receiver for at least three reasons. First, the hard limiter transfer model of FIG. 2 is only a first order approximation of the transfer function, and thus the output amplitude is constant for increasing input amplitude after the knee in the transfer curve. In an actual transmitter, the output amplitude may actually drop slightly, or even significantly, for increasing input amplitude beyond the knee or the 0 dB back off point. Second, the non-linearity distorts the signal resulting in inter-symbol interference (ISI), which adds an effective noise term at the receiver. Third, clipping the signal results in spectral re-growth, or excessive out-of-band power. While spectral re-growth does not degrade the channel over which the transmitter is operating, it does add noise to adjacent channels, causing adjacent channel interference (ACI).

Considering the case where all channels are operating similarly, the optimum drive level for obtaining the maximum SNR is determined and selected as an operating point. The loss as a function of IBO is calculated as a function of the modulation and coding used in the communications signal. In the case of a QPSK with a rate 0.66 Turbo Product Code (TPC), for example, the receiver needs an Es/No of 4.4 dB to close the link. This is a fairly low Es/No and as such the receiver can tolerate a fair amount of ISI and ACI.

Figure 3:
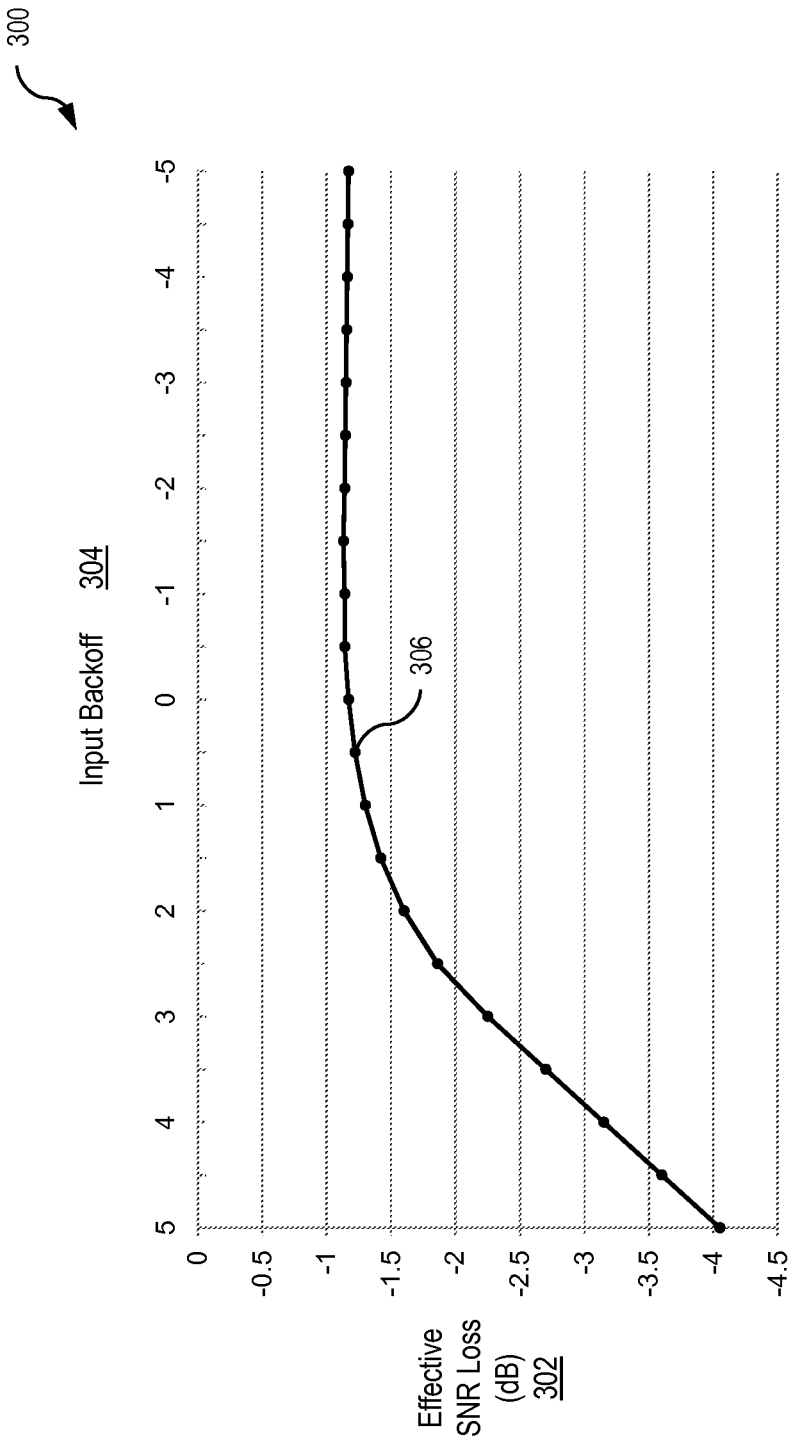
FIG. 3 illustrates a graph of the effective SNR loss as a function of IBO for the hard limited saturation transfer function of FIG. 2.

FIG. 3 illustrates a graph 300 of the effective SNR loss as a function of IBO for the hard limited saturation transfer function of FIG. 2. As illustrated in FIG. 3, graph 300 includes a y-axis 302, an x-axis 304, and a saturation point 306. Y-axis 302 represents the effective SNR loss, measured in decibels. X-axis 304 represents input backoff, measured in decibels. Saturation point 306 corresponds to a 0 dB input backoff (IBO). FIG. 3 shows a total loss of about 1.4 dB at an optimum operating point of 1.5 dB IBO. In operation, effective loss is largely constant from an IBO of roughly +0.5 dB and below. For the ideal hard limited transmitter transfer function of FIG. 2, overdriving the transmitter beyond +0.5 dB IBO into the negative IBO region results in no real improvement in received signal SNR. An actual transmitter exhibits a drop in output power with increasing input power or different amplitude and/or phase transfer characteristics that results in greater ACI, or other interference or noise. Accordingly, depending on the particular transmitter in use, and possibly other particular system control issues, the optimal IBO may be in the positive or negative range. A typical system and transmitter may result in setting +0.5 dB IBO as the optimum operating point and can accommodate a variety of transmitter devices for QPSK modulation with code rates in the range of 0.66 through 0.79321. More accurate determinations may be obtained by empirical data of particular transmitter devices; however, the selected setting, based on the ideal transfer function of FIG. 2, yields adequate results for a wide range of transmitting devices.

Figure 4:
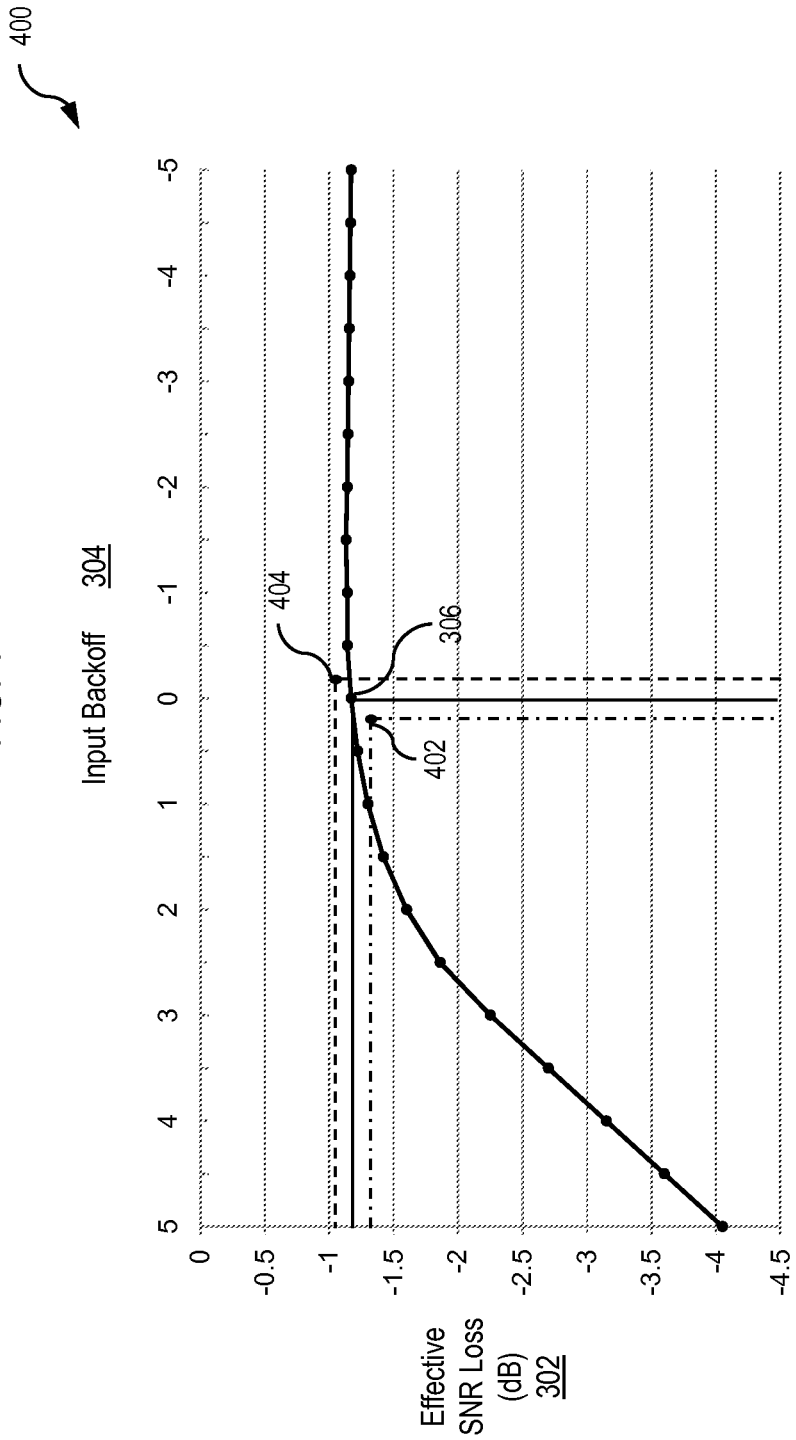
FIG. 4 illustrates a graph of two operating points outside of the saturation point for a transmitter.

FIG. 4 illustrates a graph 400 of two operating points outside of the saturation point for a transmitter. With reference to FIG. 4, graph 400 includes a y-axis 302, an x-axis 304, saturation point 306, a low operating point 402, and a high operating point 404. Low operating point 402 represents an operating point that is below the optimum operating region. High operating point 404 represents an operating point that is above the optimum operating region. In operation, a transmitter may be pushed out of the optimum operating region by uncontrollable factors such as weather. Cold weather for example, may push a transmitter to operate at low operating point 402, which is below the optimum operating range when it is cold. Warm weather may push a transmitter to operate at high operating point 404, which is above the optimum operating range. The process of determining the operating point at which a transmitter is operating will be further discussed with reference to FIG. 5.

Suppose a transmitter is operating at low operating point 402, which is just below the optimum operating point. In this case the hub receiver needs to instruct the transmitter to increase its operating power until it moves into the optimum operating range. Similarly, if a transmitter is operating at high operating point 404, the hub receiver needs to instruct the transmitter to decrease its operating power until it falls back into the optimum operating range. Continued operating outside of the optimum operating range creates a loss in signal integrity as discussed above with reference to FIGS. 2 and 3. Given a selected optimum operating point, a receiver-based saturation estimator estimates the IBO about the operating point. For example, the receiver may be configured to accurately estimate transmitter operation from the +3 dB IBO (linear operation) to −2 dB IBO (heavily saturated operation). The receiver may be further configured to estimate IBO to an accuracy of +/−1 dB in the +3 dB to −2 dB IBO range. This particular accuracy level allows for a determination of effective SNR loss of about 0.25 dB maximum.

Figure 5:
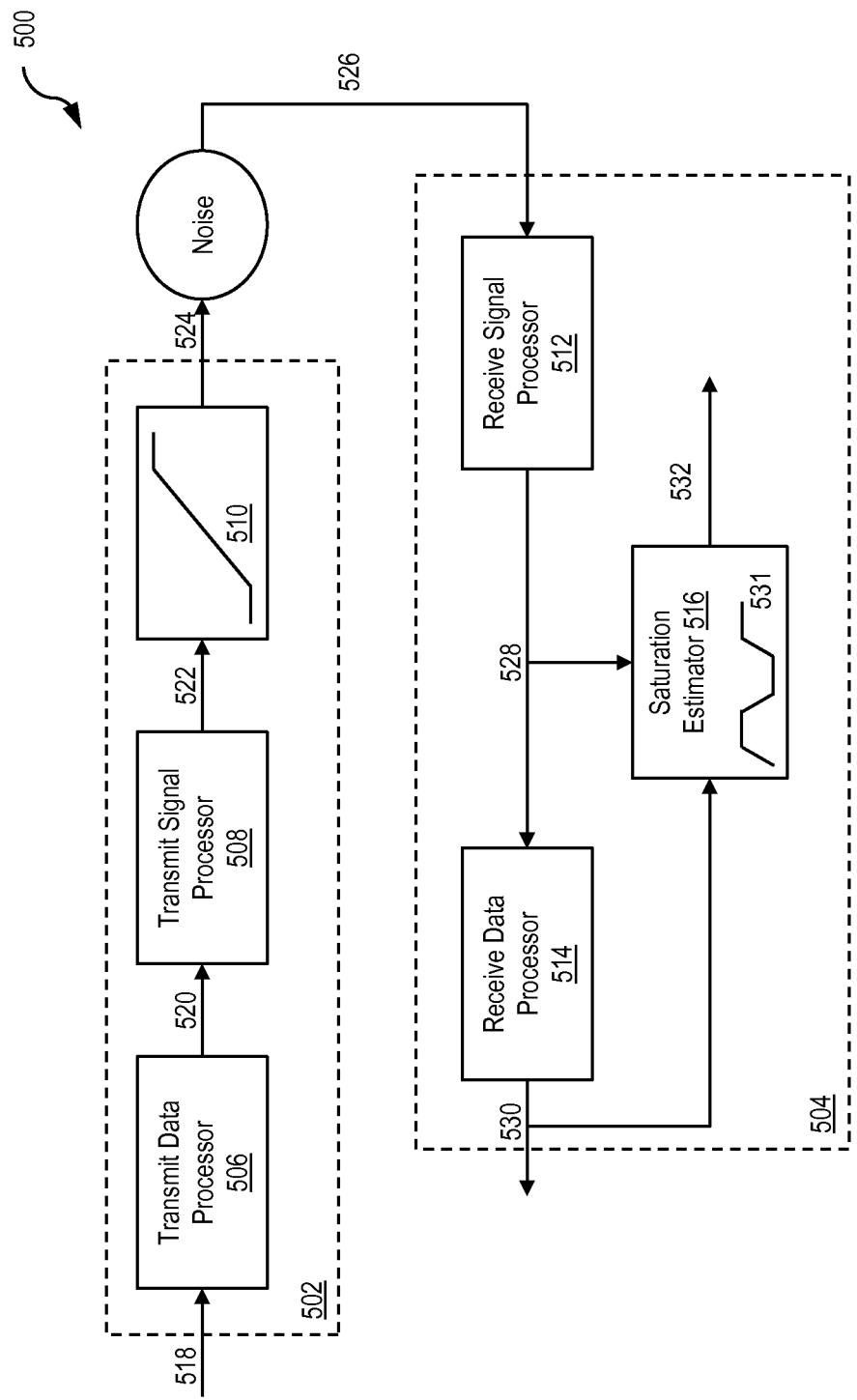
FIG. 5 illustrates a block diagram depicting a prior art implementation of a receiver-based saturation estimator system.

FIG. 5 illustrates a block diagram depicting a prior art implementation of a receiver-based saturation estimator system 500. With reference to FIG. 5, system 500 includes a transmitter 502 and a receiver 504. Transmitter 502 further includes a transmit data processor 506, a transmit signal processor 508, and an amplifier 510. Transmitter 504 further includes a receive signal processor 512, a receive data processor 514, and a saturation estimator 516. In operation, receiver 504 receives a transmitted communications signal from transmitter 502. In a satellite communications system, the receiver-based saturation estimator system may be a hub receiver. Within transmitter 502, transmit data processor 506 receives and encodes data 518 for transmission and outputs an encoded signal 520. Transmit data processor 506 may comprise digital signal processing circuitry and/or software operable to encode data 518. The transmit data processor 506 may also provide coding for error detection, error correction, or both.

Transmit signal processor 508 modulates encoded signal 520 into modulated signal 522, having a suitable format for transmission over an RF link, such as BPSK, QPSK, M-ary PSK, or other such modulation formats. The modulation may include upsampling and filtering, for example. Amplifier 510 generates a transmission signal 524 based on modulated signal 522. Amplifier 510 may be a burst transmitter, which may be operating in a linear, unsaturated region or non-linear, saturated region. If amplifier 510 is operating in the latter region, then transmission signal 524 is typically distorted due to the non-linear response of the transmitter as described above. Transmission signal 524 is then transmitted, and is received as received signal 526 by receive signal processor 512 of receiver 504. During transmission, transmission signal 524 may degrade due to noise caused by propagation losses, ACI, ICI, or any other source of communications noise. Receive signal processor 512 receives and demodulates received signal 526 and outputs a demodulated signal 528. Demodulated signal 528 is then decoded by receive data processor 514 to recover data 530.

Data 530 and demodulated signal 528 are then input into saturation estimator 516, which processes the data, demodulated signal 528, and replicated transmission data signal 531 to estimate the degree of saturation at which amplifier 510 is operating. The replicated transmitted data signal 531 will be further discussed with reference to FIG. 6. Depending on the saturation estimation, saturation estimator 516 may transmit an instruction, via saturation estimate signal 532, to amplifier 510 to increase transmit power, decrease transmit power, or decrease the signal data rate as discussed above in FIG. 3. For example, if the link quality between receiver 504 and transmitter 502 is high, but transmitter 502 is operating at saturation, receiver 504 may instruct transmitter 502 to reduce its transmit power. Conversely, if the link quality between receiver 504 and transmitter 502 is low, and transmitter 502 is operating below saturation, receiver 504 may instruct transmitter 502 to increase its transmit power. Likewise, if the link quality between the receiver 504 and transmitter 502 is low, and the transmitter is operating at or above saturation, receiver 504 may instruct transmitter 502 to decrease its data rate to maintain the link, as increasing the transmit power will likely not result in an increase in link quality.

Saturation estimator 516 may comprise a memory store that stores data related to the transfer function of transmitter 502. For example, saturation estimator 516 may store transfer function data related to graph 200 of FIG. 2, and accesses this data to estimate the saturation level at which amplifier 510 is operating. The saturation level is estimated by comparing demodulated signal 528 to replicated transmitted data signal 531. Replicated transmitted data signal 531 corresponds to the actual data signal generated at transmitter 502 and is generated in saturation estimator 516 by performing transmit data processing on the data output by receive data processor 514. Replicated transmitted data signal 531 may be an exact replica of the data signal generated at transmitter 502, or may closely approximate the actual data signal generated at transmitter 502, depending on errors. Thus, if the recovered data is correct, the actual data signal output by transmit data processor 510 of transmitter 502 can be recreated and compared to demodulated signal 528 to estimate the saturation level of transmitter 502. Alternatively, if the recovered data signal is incorrect, e.g., a transmission error is not corrected by error correction or the signal processing does not include error correction, then replicated transmitted data signal 531 may still closely approximate the actual data signal, depending on the severity of the data error, and can be compared to demodulated signal 528 to estimate the saturation level of transmitter 502. In this latter case, however, the saturation estimation may be less accurate due to errors in the transmitted data signal that corresponds to the actual data signal.

Figure 6:
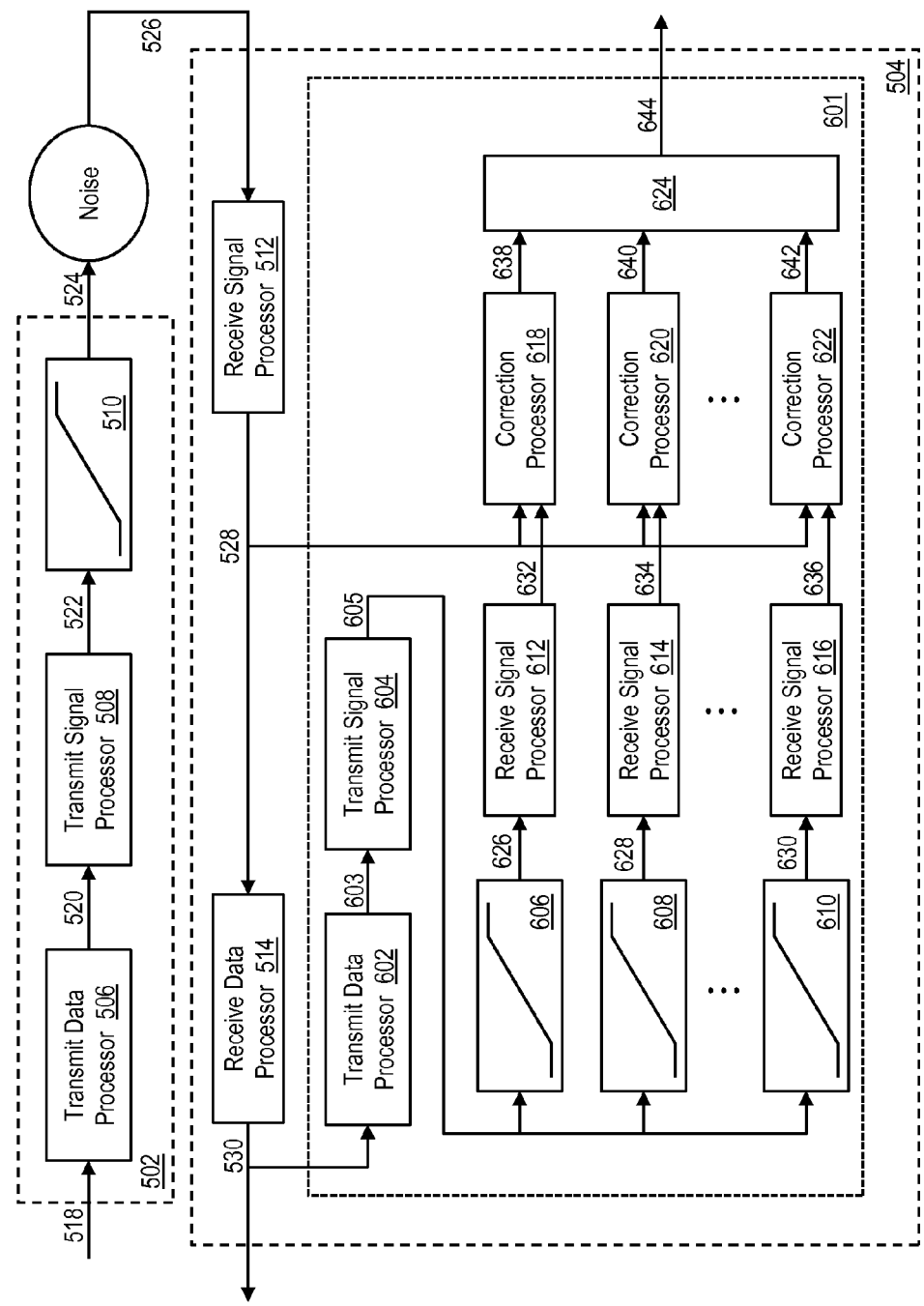
FIG. 6 illustrates a block diagram depicting a further prior art implementation of a receiver-based saturation estimator system.

FIG. 6 illustrates a block diagram depicting a further prior art implementation of a receiver-based saturation estimator system 600. With reference to FIG. 6, system 600 includes some of the same elements as FIG. 5, namely transmitter 502, receiver 504, transmit data processor 506, transmit signal processor 508, amplifier 510, receive signal processor 512, and receive data processor 514. For purposes of brevity, elements (and their respective functions) that are common between system 500 and system 600 may not be described again. System 600 also includes saturation estimator 601. Saturation estimator 601 further includes: a transmit data processor 602; a transmit signal processor 604; a plurality of transmitter saturation transfer functions components, a sampling of which are indicated by a transmitter saturation transfer function component 606, a transmitter saturation transfer function component 608 and a transmitter saturation transfer function component 610; a plurality of receive signal processors, a sampling of which are indicated by a receive signal processor 612, a receive signal processor 614, a receive signal processor 616; a plurality of correlation processors, a sampling of which are indicated by a correlation processor 618, a correlation processor 620, a correlation processor 622; and an interpolator 624.

Each of saturation transfer function components 606, 608 and 610 is operable to generate a respective estimated transmitted communications signal 626, 628 and 630, that corresponds to transmission signal 524. Each of receive signal processors 612, 614 and 616 is operable to demodulate estimated transmitted communications signals 626, 628 and 630, respectively, into demodulated signal 632, 634 and 636, respectively. Each of correlation processors 618, 620 and 622 is operable to generate correlation coefficients 638, 640 and 642, respectively, corresponding to a cross-correlation with demodulated signal 528.

In operation, saturation estimator 601 determines the saturation level of transmitter 502 by correlating demodulated signal 528 output by receive signal processor 512 with a plurality of estimated received data signals. Each correlation output corresponds to a saturation level, and the saturation level is determined by interpolation between two or more correlation output values. Saturation estimator 601 comprises a transmit data processor 602 and a transmit signal processor 604, each of which may be implemented using analog and digital signal processing hardware and/or software. Transmit data processor 602 performs similar data processing to transmit data processor 506 of transmitter 502 to produce an encoded signal 603 that corresponds to encoded signal 520 generated at the output of transmit data processor 506. Likewise, transmit signal processor 604 performs similar data processing to transmit signal processor 508 of transmitter 502 to produce modulated signal 605 that corresponds to modulated signal 522 generated at the output of transmit signal processor 508 of transmitter 502. Accordingly, for error-free recovered data, modulated signal 605 output by transmit signal processor 604 is the same as modulated signal 522 output by transmit signal processor 508 of transmitter 502.

Modulated signal 605 output by transmit signal processor 604 is provided to a plurality of saturation transfer function components (a sampling of which is indicated by saturation transfer function components 606, 608 and 610) each of which may be implemented using analog and/or digital signal processing hardware and/or software. Each of saturation transfer function components 606, 608 and 610 provides a model of amplifier 510 of transmitter 502 at a corresponding saturation level. For example, the transfer functions may cover the range of +5 dB IBO to −5 dB IBO in 1 dB increments. Other ranges and increments may also be used.

Saturation transfer function components 606, 608 and 610 generate a plurality of estimated transmitted communications signal 626, 628 and 630 that correspond to transmission signal 524 transmitted by amplifier 510 of transmitter 502. Each of estimated transmitted communications signal 626, 628 and 630 are, in turn, provided to one of receive signal processors 612, 614 or 616 that may be implemented using analog and/or digital signal processing hardware and/or software.

Each of the receive signal processors 612, 614 and 616 performs signal processing similar to receive signal processor 512 to produce a demodulated signal. Random noise effects may be ignored in receive signal processors 612, 614 and 616 because each of receive signal processors 612, 614 and 616 are configured to generate an estimated transmitted communications signal that corresponds to transmission signal 524 transmitted by amplifier 510 of transmitter 502. Noise added to each of receive signal processor 612, 614 and 616 can generally be ignored because the noise added during transmission is not significant.

Each of demodulated signals 632, 634 and 636 are correlated with demodulated signal 528 by a corresponding one of correlation processors 618, 620 or 622, each of which may be implemented using analog and/or digital signal processing hardware and/or software. Each of the correlation processors 618, 620, and 622 generate a respective correlation coefficient 638, 640 and 642, corresponding to a cross-correlation of an estimated received data signal to demodulated signal 528 output by receive signal processor 512. Each of correlation coefficients 638, 640 and 642 corresponds to a saturation level of transfer functions 606, 608 or 610.

Interpolation processor 624 may be used to interpolate between at least two correlation coefficients to determine the saturation level. Interpolation processor 624 may be implemented using analog and/or digital signal processing hardware and/or software. In one embodiment, interpolation processor 624 interpolates between the highest correlation coefficient and at least one other adjacent correlation coefficient to estimate the saturation level of transmitter 502. In another embodiment, interpolation processor 624 is not implemented. Instead, the saturation level corresponding to the highest correlation coefficient is selected as the saturation level estimate of transmitter 502.

The problem with the system and method of determining the operating point of a transmitter discussed above with respect to FIGS. 5 and 6, is that there is a "blind search." Each function should be tried in turn, and each trial requires the recomputation of the proposed function and its correlation with the received signal. What is needed is a system and method of iteratively determining the function that correlates to received signal. Embodiments of the present invention, therefore provide a system and method for determining the operating point of a transmitter using an optimized search to reduce the number of functions required to be tested. In reducing the number of functions, the number of required computations is significantly reduced, which increases efficiency.

In contrast to methods described above with reference to FIGS. 5 and 6, a system and method in accordance with aspects of the present invention only use a single function in attempt to recreate the signal that was transmitted by a transmitter. Aspects of the present invention exploit a manner of characterizing an amplifier by two parameters, α and β in a single function as follows:

$$\hat{y}=F2(x)=\alpha F1(\beta x). \quad (1)$$

The variable $\hat{y}$ represents the amplification characteristics created when transmitting a signal. The variable α represents an additional receive signal level variable and does not necessarily have to be included. In general, automatic gain control of a receiver generally accounts for the signal level variable. Determining α and β can be viewed as a nonlinear optimization problem. Any known optimization technique may be used to determine the values of α and β. In an example embodiment, a sequential least squares programming (SLSQP) process is used, wherein the values of α and β can be determined iteratively for which the values minimize the signal error, using equation 1. The signal error, e, is defined as:

$$e=\hat{y}-y \quad (2)$$

Once the signal error, e, has been minimized, the IBO of the transmitter may be determined. In contrast with systems discussed above with reference to FIGS. 5 and 6, the signal error can be minimized iteratively rather than using a table of functions in a blind search. This reduces the computational resources and time necessary to determine the operation point of a transmitter.

Figure 7:
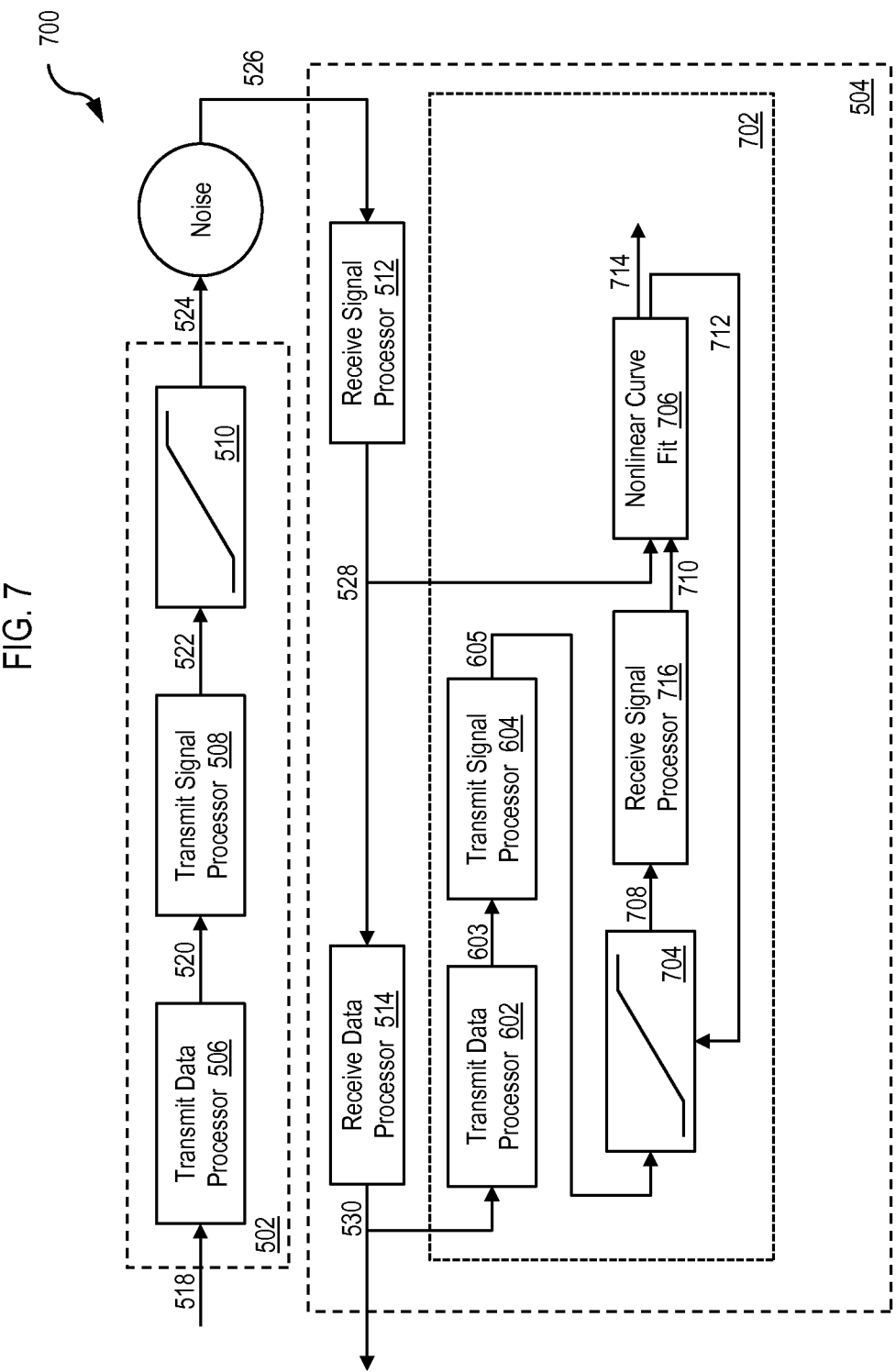
FIG. 7 illustrates a block diagram depicting a receiver-based saturation estimator system, in accordance with example embodiments of the present invention.

FIG. 7 illustrates a block diagram depicting a receiver-based saturation estimator system 700, in accordance with example embodiments of the present invention. FIG. 7 comprises some of same elements of FIGS. 5 and 6, transmitter 502, receiver 504, transmit data processor 506, transmit signal processor 508, amplifier 510, receive signal processor 512, receive data processor 514, transmit data processor 602, transmit signal processor 604, and receive signal processor 614. For purposes of brevity, elements (and their respective functions) that are common between system 600 and system 700 may not be described again. FIG. 7 further comprises a saturation estimator 702. Saturation estimator 702 further includes variable transmitter saturation transfer function component 704 and a non-linear curve fit component 706. Variable transmitter saturation transfer function component 704 is operable to generate a plurality of estimated transmitted communications signals that correspond to transmission signal 524 transmitted by amplifier 510 of transmitter 502.

Variable transmitter saturation transfer function component 704 is configured to process the received transmission signal to generate a replica transmission signal that estimates the encoded and modulated initial source signal. Variable transmitter saturation transfer function component 704 also includes a demodulator/decoder component configured to demodulate and decode the received transmission signal to generate a replica source signal that estimates the initial source signal and an encoder/modulator component configured to encode and modulate the replica source signal to generate a replica transmission signal that estimates the encoded and modulated initial source signal. Non-linear curve fit 706 is configured to determine an optimal parametric function for modeling the source transmitter, wherein the determination of the optimal parametric function comprises an iterative non-linear curve-fitting process, and wherein the optimal parametric function reflects one or more parameters of the source transmitter.

Figure 8:
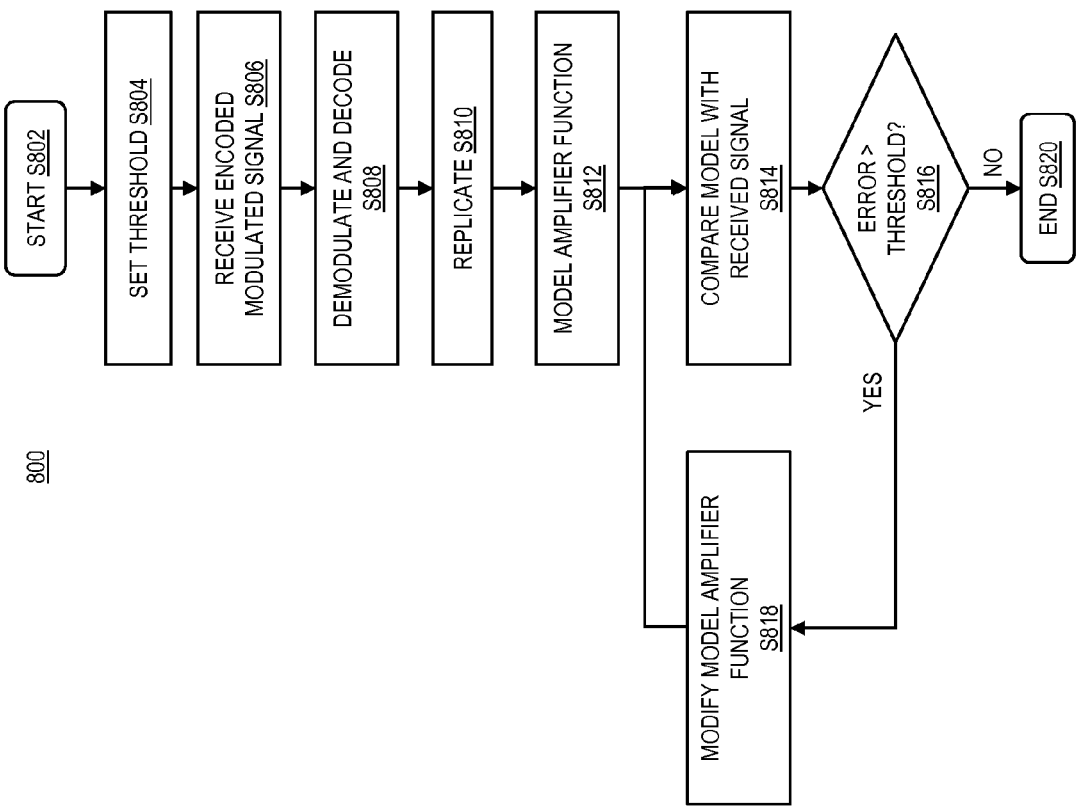
FIG. 8 illustrates a flow chart specifying a process for estimating a transmitter operating point, in accordance with example embodiments of the present invention.

FIG. 8 illustrates a flow chart specifying a process 800 for estimating a transmitter operating point, in accordance with example embodiments of the present invention. Method 800 starts (S802) and an error threshold is set (S804). As mentioned earlier, an aspect of the invention is drawn to: finding an error between a replicated original signal and a signal created with a modeled transmit amplifier function; and iteratively changing the two variables of the single function to minimize the error. To minimize the error, it may be compared to a predetermined acceptable threshold. As such, an acceptable error threshold is first set. The encoded modulated signal in then received (S806). For example, transmit substation 510 receives a data signal from transmit signal processor 508 and transmits transmission signal 524. Transmission signal 524 is received by receive signal processor 512 as received signal 526.

The received signal is then demodulated and decoded (S808). Once received, receive signal processor 512 sends demodulated signal 528 to receive data processor 514 and non-linear curve fit 706. Receive data processor 514 then provides data 530 to transmit data processor 602. A signal is then replicated (S810). For example, transmit data processor 602 performs similar data processing to transmit data processor 506 of transmitter 502 to produce transmitted data signal 601 that corresponds to encoded signal 520 generated at the output of transmit data processor 506. Likewise, transmit signal processor 604 performs similar data processing to transmit signal processor 508 of transmitter 502 to produce modulated signal 605 that corresponds to modulated signal 522 generated at the output of transmit signal processor 508 of transmitter 502.

The amplifier function is then modeled (S812). For example, transmit signal processor 604 then transmits modulated signal 605 to variable transmitter saturation transfer function component 704. Unlike process 600, in saturation estimator 702 there is only one transfer function. Variable transmitter saturation transfer function component 704 generates an initial estimated modeled signal 708 that correspond to transmission signal 524 transmitted by amplifier 510 of transmitter 502. After variable transmitter saturation transfer function component 704 generates modeled signal 708, it sends communications signal 708 to receive signal processor 716. Signal processor 716 then performs signal processing similar to receive signal processor 512 to produce a replicated demodulated signal 710.

Many techniques have been developed to optimize the search process in modeling the amplifier function. For example, different algorithms may be applied in the modeling of the amplifier function. One such example may be Powell's method (or Powell's conjugate direction method) may be applied, whereby a real-valued function of a fixed number of real-valued inputs is modeled. According to this method, the function is minimized based on an initial point and a bi-directional search along each of a plurality of search vectors. A new point is then be expressed as a linear combination of the search vectors, and the displacement vector becomes a new search vector added to the end of the search vector list. The search vector that most significantly affects the new direction (e.g., the one that was most successful) is deleted from the search vector list. The algorithm is then iterated an arbitrary number of times until no further significant improvement is made.

The replicated signal is then compared with the received signal (S814). For example, at this point, replicated demodulated signal 710 and demodulated signal 528 are both sent to non-linear curve fit 706. Non-linear curve fit 706 then compares demodulated signal 528 and replicated demodulated signal 710 in accordance with equation (1).

It is then determined whether the error is greater than the predetermined threshold (S816). In accordance with equation (2), if the error is greater than the predetermined threshold (see S804), then replicated demodulated signal 710 is too dissimilar to demodulated signal 528 (YES at S816). In such a case, then non-linear curve fit component 706 sends feedback signal 712 to variable transmitter saturation transfer function component 704 that alters the values of the variables $\alpha$ and $\beta$ from equation (1). This process is repeated (return to S814) until non-linear curve fit 706 reaches the closest correlation between replicated demodulated signal 710 and demodulated signal 528 (NO at S816).

Now, depending on the saturation estimation, saturation estimator 702 of receiver 504 may transmit an instruction to amplifier 510 of transmitter 502, via signal 714, to increase transmit power, decrease transmit power, or decrease the signal data rate. If the link quality between receiver 504 and transmitter 502 is low, and transmitter 502 is operating below saturation, saturation estimator 702 of receiver 504 may instruct amplifier 510 of transmitter 502, to increase its transmit power. Likewise, if the link quality between the receiver 504 and transmitter 502 is low, and transmitter 502 is operating at or above saturation, saturation estimator 702 of receiver 504 may instruct transmitter 502 to decrease its data rate to maintain the link, as increasing the transmit power will likely not result in an increase in link quality.

In contrast to the methods discussed above with reference to FIGS. 5 and 6, the embodiments provided in accordance with aspects of the present invention take advantage of non-linear curve fitting. Using non-linear curve fitting as iterative optimization technique performs the search in an optimized manner, reducing the number of trials needed to obtain a given accuracy when calculating the saturation point of a transmitter. Non-linear curve fitting maximizes the efficiency and cost of each transmitter being used, while still allowing precise control of the operation point of the transmitter and its component.

FIG. 9 illustrates a block diagram of a chip set that can be utilized in implementing example embodiments of the present invention. With reference to FIG. 9, chip set 900 includes, for instance, processor and memory components described with respect to the foregoing example embodiments, and incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 900 includes a communication mechanism such as a bus 901 for passing information among the components of the chip set. A processor 903 has connectivity to the bus 901 to execute instructions and process information stored in, for example, a memory 905. The processor 903 includes one or more processing cores with each core configured to perform independently. A multi-core processor enables multiprocessing within a single physical package. Examples of a multi-core processor include two, four, eight, or greater numbers of processing cores. Alternatively or in addition, the processor 903 includes one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, and/or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 may comprise various forms of computer-readable media, e.g., including both dynamic memory (e.g., RAM) and static memory (e.g., ROM) for storing executable instructions that, when executed by the processor 903 and/or the DSP 907 and/or the ASIC 909, perform the process of example embodiments as described herein. The memory 905 also stores the data associated with or generated by the execution of the process.

The term "computer-readable medium" or "computer-readable media," as used herein, refers to any medium that participates in providing instructions for execution by the processor 903, and/or one or more of the specialized components, such as the one or more digital signal processors (DSP) 907, and/or one or more application-specific integrated circuits (ASIC) 909. Such a medium may take many forms, including but not limited to non-volatile media, volatile media, and transmission media. Non-volatile media include, for example, read only memory (ROM), included within memory 905. Volatile media, for example, may include dynamic random access memory (RAM), included within memory 905. Transmission media may include copper or other conductive wiring, fiber optics, or other physical transmission media, including the wires and/or optical fiber that comprise bus 901. Transmission media can also take the form of wireless data signals, such as those generated during radio frequency (RF) and infrared (IR) data communications. Common forms of computer-readable media include, for example, magnetic storage media (e.g., magnetic hard disks or any other magnetic storage medium), solid state or semiconductor storage media (e.g., RAM, PROM, EPROM, FLASH EPROM, a data storage device that uses integrated circuit assemblies as memory to store data persistently, or any other storage memory chip or module), optical storage media (e.g., CD ROM, CDRW, DVD, or any other optical storage medium), a or any other medium for storing data from which a computer or processor can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Moreover, as will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention.

While example embodiments and aspects of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. An apparatus comprising:
a receiver configured to receive an input signal, wherein the received input signal reflects an encoded and modulated initial source signal, as amplified by a transmit amplifier of a source transmitter and transmitted over one or more channels of a wireless communications network;
a demodulator configured to demodulate the received input signal to generate a demodulated input signal;
a decoder configured to decode the demodulated input signal to generate a decoded input signal;
an encoder and a first modulator respectively configured to encode and modulate the demodulated input signal to generate a received version of the encoded and modulated initial source signal as received by the receiver;
a first signal processor configured to generate an estimated signal, that estimates the encoded and modulated initial source signal as amplified by the transmit amplifier, based on a transfer function that models one or more characteristics of the transmit amplifier;
a second modulator configured to modulate the estimated signal; and
a second signal processor configured to compare the modulated estimated signal and the demodulated input signal to determine a signal error that reflects a correlation between the two, and to determine whether the signal error is within a predetermined threshold; and
wherein, when it is determined that the signal error is not within the predetermined threshold, the second signal processor is further configured to determine an update to the transfer function via a non-linear optimization technique to reflect a more accurate model of the transmit amplifier characteristic(s), and to send a corresponding feedback signal to the first signal processor;
wherein the first signal processor, the modulator, and the second signal processor are further configured to perform the generation of the estimated signal, the modulation of the estimated signal, and the determination of the signal error and the transfer function update, respectively, as an iterative process, until it is determined that the signal error is within the predetermined threshold, wherein, in view of the feedback signal, for each iteration the first signal processor is configured to generate the estimated signal based on the updated transfer function; and
wherein a determination that the signal error is within the predetermined threshold indicates that the transfer function of the respective iteration models the transmit amplifier characteristic(s) to a degree of accuracy associated with the predetermined threshold.

2. The apparatus of claim 1, wherein the transfer function comprises one or more parameters configured to model the transmit amplifier characteristic(s), wherein the parameter(s) comprise a gain parameter reflecting an amplification gain of the transmit amplifier.

3. The apparatus of claim 2, wherein the first signal processor is configured to generate the estimated signal $\hat{y}$, as follows:

$$\hat{y} = F1(\beta x)$$

where $\beta$ represents the gain parameter reflecting the amplification gain of the transmit amplifier and F1 represents the transfer function.

4. The apparatus of claim 2, wherein the first signal processor is configured to generate the estimated signal $\hat{y}$, as follows:

$$\hat{y} = \alpha F1(\beta x)$$

where $\beta$ represents the gain parameter reflecting the amplification gain of the transmit amplifier, $\alpha$ represents an additional input signal level variable, and F1 represents the transfer function.

5. The apparatus of claim 2, wherein the iterative process comprises a non-linear optimization process for determining the parameter(s) for the transfer function in an efficient manner designed to minimize the number of iterations.

6. A method comprising:
receiving an input signal, wherein the received input signal reflects an encoded and modulated initial source signal, as amplified by a transmit amplifier of a source transmitter and transmitted over one or more channels of a wireless communications network;
demodulating the received input signal to generate a demodulated input signal;
decoding the demodulated input signal to generate a decoded input signal;
encoding and modulating the demodulated input signal to generate a received version of the encoded and modulated initial source signal;
generating an estimated signal, that estimates the encoded and modulated initial source signal as amplified by the transmit amplifier, based on a transfer function that models one or more characteristics of the transmit amplifier;
modulating the estimated signal; and
comparing the modulated estimated signal and the demodulated input signal to determine a signal error that reflects a correlation between the two, and determining whether the signal error is within a predetermined threshold; and
wherein, when it is determined that the signal error is not within the predetermined threshold, the method further comprises determining an update to the transfer function via a non-linear optimization technique to reflect a more accurate model of the transmit amplifier characteristic (s), and generating a corresponding feedback signal;
wherein the generation of the estimated signal, the modulation of the estimated signal, and the determination of the signal error and the transfer function update are performed as an iterative process, until it is determined that the signal error is within the predetermined threshold, wherein, in view of the feedback signal, for each iteration the estimated signal is generated based on the updated transfer function; and
wherein a determination that the signal error is within the predetermined threshold indicates that the transfer function of the respective iteration models the transmit amplifier characteristic(s) to a degree of accuracy associated with the predetermined threshold.

7. The method of claim 6, wherein the transfer function comprises one or more parameters configured to model the transmit amplifier characteristic(s), wherein the parameter(s) comprise a gain parameter reflecting an amplification gain of the transmit amplifier.

8. The method of claim 7, wherein the estimated signal $\hat{y}$ is generated as follows:

$$\hat{y}=F1(\beta x)$$

where $\beta$ represents the gain parameter reflecting the amplification gain of the transmit amplifier and F1 represents the transfer function.

9. The method of claim 7, wherein the estimated signal $\hat{y}$ is generated as follows:

$$\hat{y}=\alpha F1(\beta x)$$

where $\beta$ represents the gain parameter reflecting the amplification gain of the transmit amplifier, $\alpha$ represents an additional input signal level variable, and F1 represents the transfer function.

10. The method of claim 7, wherein the iterative process comprises a non-linear optimization process for determining the parameter(s) for the transfer function in an efficient manner designed to minimize the number of iterations.

* * * * *